United States Patent [19]

Lo et al.

[11] Patent Number: 4,853,944
[45] Date of Patent: Aug. 1, 1989

[54] DIGITAL AM/FM/φM DEMODULATOR

[75] Inventors: Pei-hwa Lo, Ramsey; James M. Sokolich, Cliffside Park; Ardis M. Matesich, Englewood Cliffs, all of N.J.

[73] Assignee: Allied-Signal Inc., Morris Township, Morris County, N.J.

[21] Appl. No.: 133,104

[22] Filed: Mar. 10, 1988

[51] Int. Cl.$^4$ ............................................. H04L 27/06
[52] U.S. Cl. ...................................... 375/94; 455/142; 329/1
[58] Field of Search .................. 375/75, 77, 80, 94; 455/142, 143; 329/1, 2

[56] References Cited

U.S. PATENT DOCUMENTS

| | | | |
|---|---|---|---|
| 4,050,022 | 9/1977 | McFadyen et al. | 455/143 |
| 4,135,158 | 1/1979 | Parmet | 455/143 |
| 4,455,665 | 6/1984 | Kromer, III | 375/14 |
| 4,470,147 | 9/1984 | Goatcher | 329/1 |
| 4,726,069 | 2/1988 | Stevenson | 375/77 |
| 4,731,796 | 3/1988 | Masterton et al. | 455/142 |

Primary Examiner—Robert L. Griffin
Assistant Examiner—Stephen Chin
Attorney, Agent, or Firm—Howard G. Massung

[57] ABSTRACT

Traditionally, the parameters evaluation and characterization of amplitude modulation(AM), frequency modulation(FM) and phase modulation(φM) signals are achieved utilizing analog test and measurement instruments. The advancement of high speed analog to digital converters and digital signal processing techniques have made this digital AM/FM/φM demodulator an accurate, repeatable and cost effective alternative for the test and measurement of various modulation waveforms. This invention illustrates the design of the digital AM/FM/φM demodulator.

9 Claims, 5 Drawing Sheets

FREQUENCY MODULATION SIGNAL

DIGITAL AM/FM/φM DEMODULATOR

FIELD OF THE INVENTION

This invention relates to signal demodulators in which digital filtering and signal processing techniques may be utilized. More specifically, it is directed to an apparatus that allows the frequency down converting of a modulated signal to an A/D converter for executing a digital demodulation algorithm and analyzing the modulating signal and its parameters. The apparatus has particular utility in automatic test equipment (ATE) for testing radio equipment. It is feasible for real time signal processing implementation as well.

While the description relates to ATE applications, the inventive techniques will lend themselves to other real time signal processing applications.

BACKGROUND OF THE INVENTION

The widespread use of narrow and spread spectrum signals modulated by different criteria in aircraft necessitates the use of an adaptive microwave test set. Such an adaptive rf/microwave test set could test a wide variety of communications, radio navigation and electronic warfare equipment.

Traditionally, the parameters evaluation and characterization of amplitude modulated (AM), frequency modulated (FM) and phase modulated (φM) signals are achieved utilizing analog test and measurement instruments. The advancement of high speed analog-to-digital converters and digital signal processing techniques have made a digital AM/FM/φM demodulator an accurate, repeatable and cost effective alternative for the test and measurement of various modulation waveforms. In the test and measurement of electronic warfare (EW), electronic countermeasures (ECM) and communication systems, the message signals which are transmitted from or received by the unit under test (UUT) are often modulated. For instance, signals generated by an airborne radar system are amplitude modulated. Doppler navigators or doppler frequency jammers receive or transmit frequency modulated signals. In communication systems, in order to reduce noise and interference on the message signal and to ease radiation and frequency channel assignments for broadcasting, amplitude or frequency modulation techniques are commonly used. Performance evaluation and characteristic measurements of these systems have conventionally been done by setting up multiple test procedures and employing many specialized instruments. The carrier frequency can be measured using a frequency counter while the modulating signal source is properly terminated or disconnected. Without modulating a carrier signal, the modulating signal (message signal) is analyzed with an oscilloscope or other computer based instrumentation. Finally, the modulator characteristics are measured with a modualtion analyzer and a spectrum analyzer. These testing steps assume that the system can be disassembled and that the individual functional units (or UUTs) are accessible by test engineers. Unfortunately, this assumption may not be valid, especially at remote depot areas where skilled test technicians and sophisticated test and measurement instrumentation are not available.

This invention is directed to a new technique which analyzes modulation parameters, carrier frequency and modulating signal characteristics without requiring reconfiguration or disassociation of the system. It is contemplated that this technique is in compliance with the emerging demand for a new generation of integrated test systems.

Hardward-based Analog Demodulation techniques for AM/FM/φM (amplitude demodulated/frequency modulated/phase modulated) signals have been developed and used for many years. These techniques may be found in K. S. Shanmugam, "Digital and Analog Communication Systems", John Wiley & Sons, New York, N.Y. 10016 (1979); and H. E. Rowe, "Signals and Noise In Communications Systems", D. Van Nostrand Company, Princeton, N.J. (1965).

In order to accurately measure the carrier signal, the modulating waveform and the modulation characteristics, precise analog components are required to construct the demodulator. For instance, in the FM demodulation case, a wide range linear frequency discriminator is necessary to demodulate a modulation signal with a large peak frequency deviation. Because of analog components are nonlinear and temperature dependent, compensation circuits to eliminate harmonic distortions and temperature drift are needed. This will complicate the design and reduce measurement repeatability. Additional instruments such as oscilloscopes or spectrum analyzers are used to measure the demodulating signal. The test and measurement system becomes expensive and less portable.

Equipment, such as radio sets or Doppler frequency jammers, requires fast, accurate and portable testers for the measurement of modulated waveforms. To meet these requirement it was necessary to develop efficient time domain digital AM, FM and φM demodulation techniques. Such demodulation techniques would enable an economical, accurate and portable implementation for the measurement of the modulating signal and the frequency of the carrier signal. It was further desired to process batch data as well as continuous data. The advancement of digital techniques has made waveform measurement and signal parameters characterization accurate, faster and more repeatable than ever before.

SUMMARY OF THE INVENTION

This invention presents a demodulation scheme based upon digital signal processing techniques. This digital AM/FM/φM demodulation system configuration receives an RF signal, which is down converted to the IF frequency range where the signal can be adequately digitized. In an analog demodulation system, the IF signal needs to be tuned to a designated frequency so that optimum demodulation performance may be obtained. In a digital demodulator, this limitation is overcome because a very wide, high accuracy operation range is available using a digital differentiator. This alleviates the stringent design requirements of the frequency down converter circuit. Since demodulated signals are in a digital format, they are readily available for further digital measurements and characterizations. Commercial function generators and a commercial signal digitzer are used to generate and digitize AM and FM signals. These signals are then processed by our demodulation software. As an example, a carrier signal is amplitude modualted by a pulse signal. The AM signal is digitalized and then amplitude demodualted by the digital AM demodulator. The demodulated signal, which appears as a pulse signal, closely resembles the original modulating signal. Similarly, the modulating signal of an FM signal is successfully reconstituted by the digital FM demodulator.

In general, various demodulated waveforms can be further measured by corresponding waveform measurement algorithms. Employing these techniques enhances the measurement capacity of the digital signal demodulator.

DETAILED DESCRIPTION OF THE PREFERRED EMBODIMENT

Figure 1:
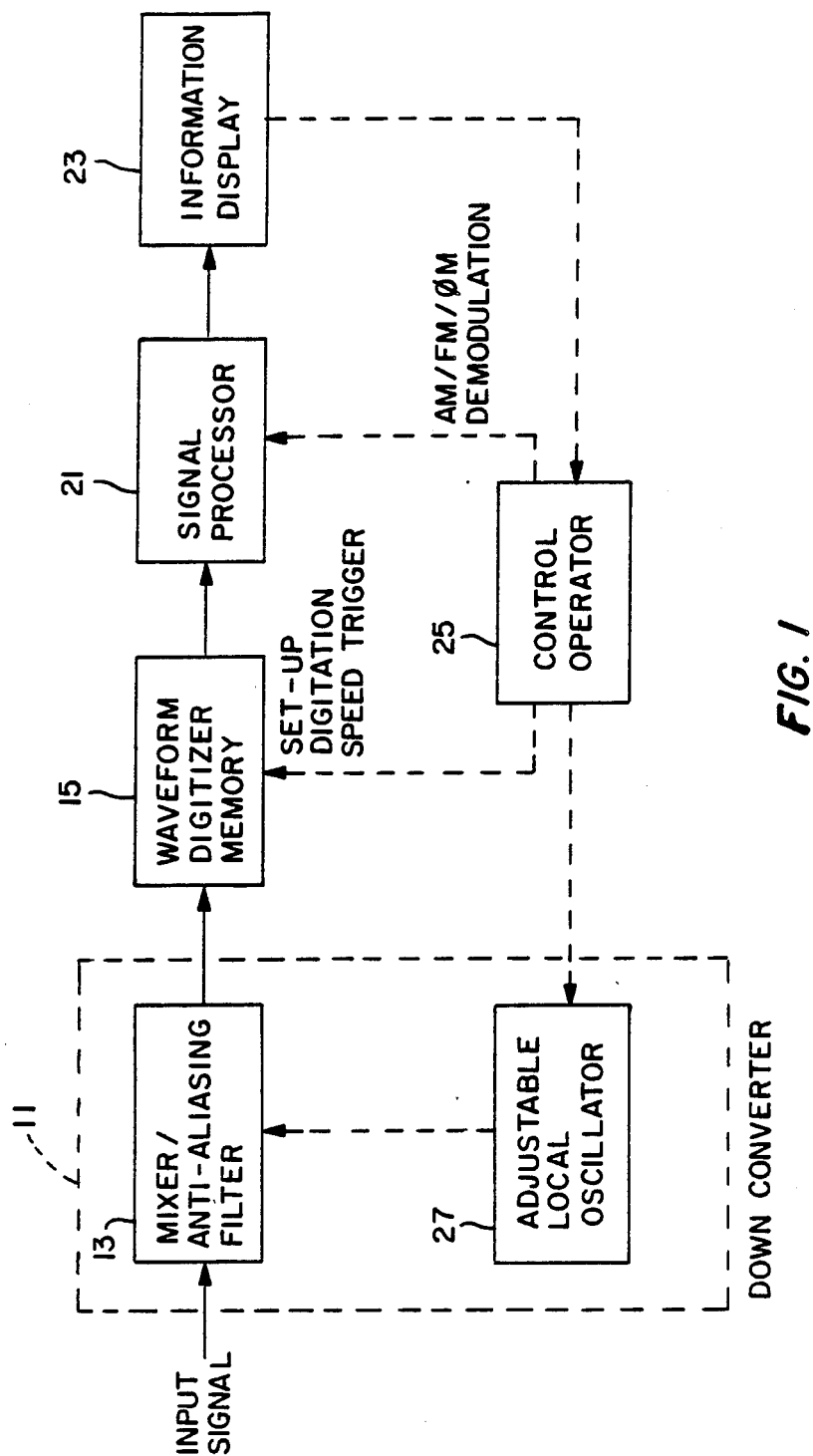
FIG. 1 is a schematic block diagram showing the operation of the preferred embodiment of the invention.

In order to demodulate signals, the signals which are provided to the demodulator are first down converted, as necessary, using down converter 11. At this point, the down converter 11 uses a mixer and an anti-aliasing low pass filter 13 in order to provide an appropriate output. The down-converted waveform is then provided to a digitizer 15. The digitizer 15 includes a memory and is able to provide a digital representation of the input signal. The digital representation of the input signal is then provided to a signal processor 21, which demodulates the digitized input signal and provides a representation of the modulated signal to an information display 23 and/or test equipment 25. The test equipment 25 controls a local oscillator 27 in the down converter 11, which, in turn, provides input to the mixer 13.

The signal processor 21 is able to obtain information concerning the modulation characteristics of the input signal by digitally analyzing the digitized signal which is received from the digitizer 15. The logic applied in this analysis is diagramatically shown in FIG. 2.

Figure 2:
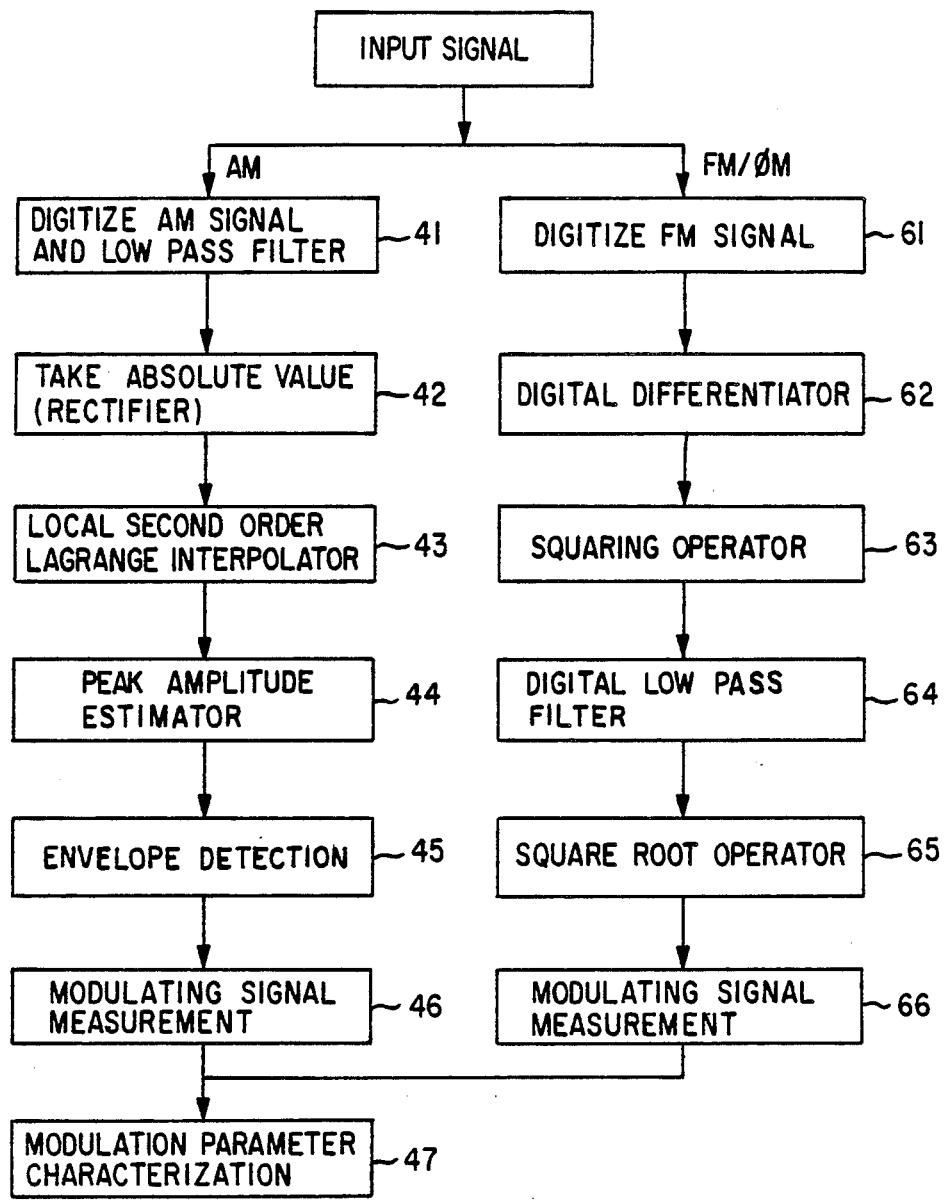
FIG. 2 is a flow chart showing the operation of the preferred embodiment.

Referring to FIG. 2, the techniques used for extracting information from different types of digitized signals, such as AM, FM, $\phi$M and signals differ. In the case of AM demodulation, this signal is down-converted and digitized, as represented by block 41. This is accomplished by using the down-converter 11 and the digitizer 15, as mentioned above, to provide a down-converted and digitized signal. The digitizer 15 includes a memory which, in the experimental configuration of the invention, includes 16K 9-bit words. This allows the digitizer 15 to take a sample waveform consisting of 16,584 points. The signal processor 21 is then able to obtain the sample. The signal processor 21 takes an absolute value of the sample, as represented in block 42. Since it is desirable to cover a wide demodulation frequency range with the chosen digitization rate the peak amplitude of the received signal may not be consistently attainable. For this reason, a local second order Lagrange interpolator is used around a detected peak point, as represented by block 43. The peak amplitudes may then be estimated by the interpolation functions, as represented by block 44. This may be accomplished by fitting three interpolated points into:

$P = a \text{ SIN}(\omega t + \phi)$, where

P = the point;
a is the estimated peak;
$\omega$ is the frequency; and
$\phi$ is the phase.

Figure 3A:
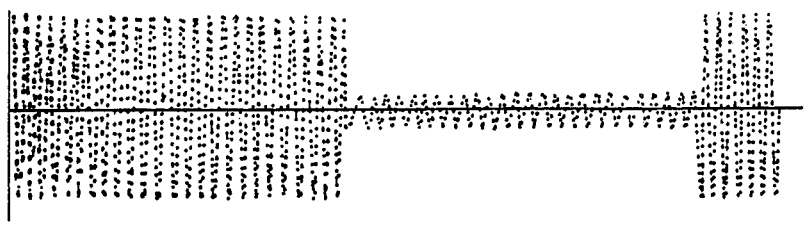
FIGS. 3A-3C show an amplitude modulated (AM) signal (FIG. 3A), its corresponding modulating signal (FIG. 3B) and the demodulated signal (FIG. 3C)
Figure 3B:
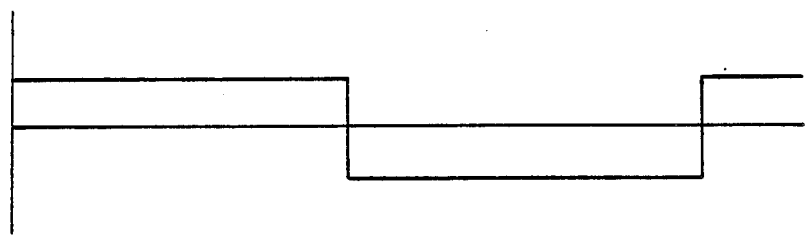
Figure 3C:

Linear interpolation can therefore be made between peak points. This allows an envelope detection, as represented by block 45. This signal is then filtered using low pass filter techniques and the modulating signal is measured, as represented by block 46 and characterized, as represented by block 47. The characterized modulating signal may then be displayed on the information display 23, as well as the modulating signal from signal generator steps for comparison. FIG. 3 show an AM signal (FIG. 3A), signal (FIG. 3B) and the display of the reconstituted modulating signal (FIG. 3C).

The signal model for the FM signal (FIG. 4A) can be written as:

$$F(t) = A \text{ SIN}(\omega_c t + K_f \int X(u) du),$$

where A is a constant amplitude; $\omega_c$ is the carrier frequency, $K_f$ is an integration gain constant; and X is the modulating signal. The modulation index D(FM) is defined as:

$$D(FM) = \Delta F / F_X \text{ where}$$

$\Delta F$ is peak frequency deviation; and
Fx is the modulation rate.

In the tone modulation case, Fx becomes the frequency of the modulating signal X(t). It can be shown that the separation width between two spectrum lines in the FM spectrum is determined by the modulation rate. The magnitude of the spectrum lines is related to the modulation index.

The digital FM demodulation scheme may be derived as follows. Taking derivative of the FM signal model with respect to time and squaring the resulting waveform yields:

$$A^2(\omega_c + K_f X(t))^2 \text{ COS}^2(\omega_c t + K_f \int X(u) du) = (A^2/2)(\omega_c + K_f X(t))^2 (1 + \text{COS}(2*W_c t + 2*K_f \int X(u) du))$$

Since the carrier frequency is much higher than the modulating frequency, the modulating signal can be extracted by low pass filtering the high frequency components and the square root operation. The result is:

$$y(nt) = A(\omega_c + K_f X(nt))$$

In the FM tone modulation case, the carrier frequency can be measured directly from this.

In order to accomplish this digitally, the signal is first digitized in memory as a 16K point signal, as represented by block 61. The digitized signal can be represented by the equation:

$$g(t) = \text{SIN}(\omega_c t + f(t))$$

This signal is then differentiated, as represented by block 62 in accordance with the formula:

$$\frac{dg}{dt} = \left(\omega_c + \frac{df}{dt}\right) \text{COS}(\omega_c t + f(t))$$

The differentiated signal is then squared, as represented by block 63. This provides the results $$\left(\omega_c + \frac{df}{dt}\right)^2 \cos(\omega_c t + f(t))^2 =$$

$$\left(\omega_c + \frac{df}{dt}\right)^2 \left(\frac{1}{2} + \frac{1}{2}\cos(2\omega_c t + 2f(t))\right)$$

Since COS $(2\omega_c t + f(t))$ is at higher frequency, low pass filtration is then able to eliminate the cosine at higher frequency portion portion as represented by block 64:

$$\left(\omega_c + \frac{df}{dt}\right)^2 \left(\frac{1}{2}\right).$$

Figure 4A:
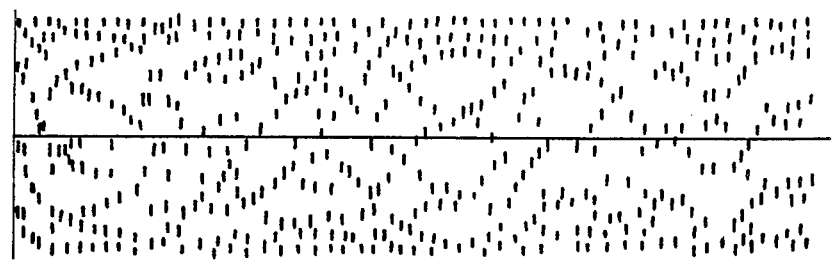
FIGS. 4A and 4 show a frequency modulated signal (FIG. 4A), its corresponding modulating signal (FIG. 4B) and the demodulated signal (FIG. 4C)
Figure 4B:
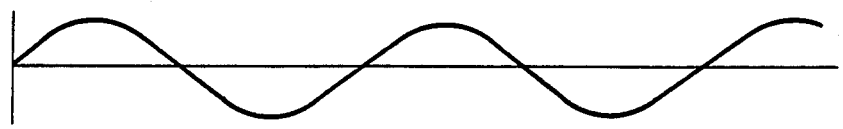
Figure 4C:
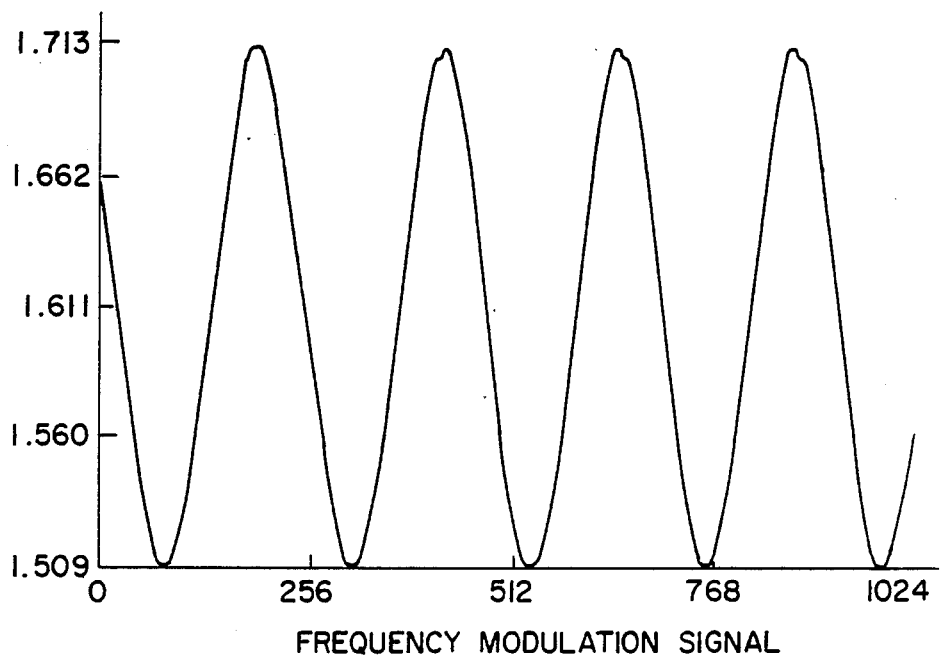

This result must be multiplied by 2 in order to eliminate the ½ fraction. A square root operator, represented by block 65 is able to provide an appropriate signal which is used as a modulating signal measurement, as represented by block 66. The modulation is then measured according to frequency modulation (f) or phase modulation (the integral ∫fdt). FIG. 4A shows a FM modulation signal, FIG. 4B shows the generated modulating signal, and FIG. 4C shows the reconstituted modulating signal.

Figure 5:
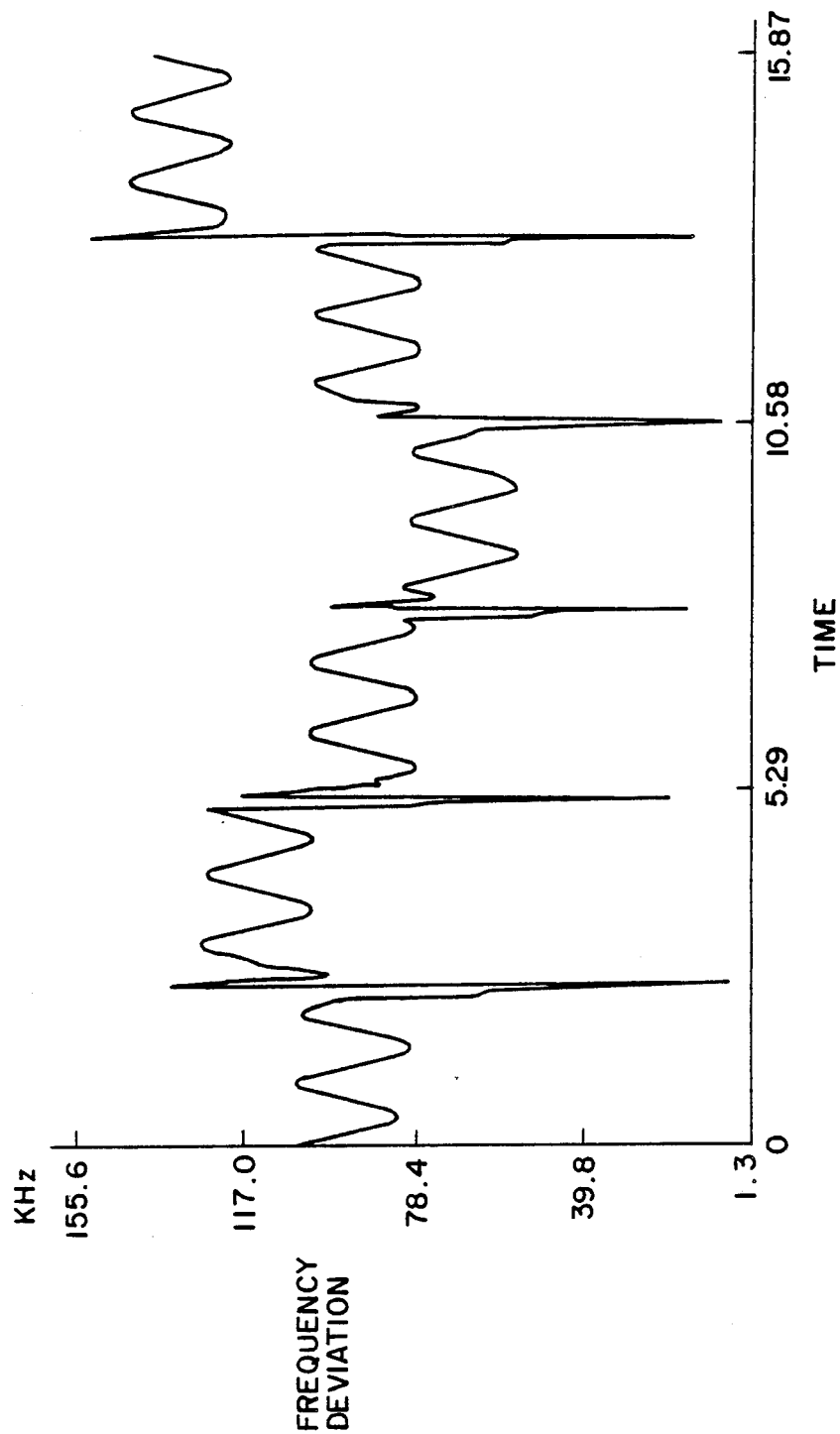
FIG. 5 shows a demodulated frequency hopping FM signal.

The above configuration describes an experimental arrangement. It is anticipated that production applications of the invention will include numerous modifications. For example, the control operator may be automated test equipment such as the Bendix 9070 Portable Module tester, sold by Allied-Signal Inc., Bendix Test Systems Division, Teterboro, N.J. It is also possible to use the inventive concepts as a part of communication system test equipment. Because the control operator 25 is able to control the adjustable local oscillator 27, the present invention may also be used in order to monitor or test "frequency hopping" or spread spectrum radio transmissions. FIG. 5 shows a reconstituted frequency hopping signal, where a frequency deviation appears to change every 2.5 milliseconds.

For these reasons, the present invention should be read only as limited by the claims.

We claim:

1. Demodulator for signals which may have different forms of modulation of carriers, in which the modulation is converted to a digital form, characterized by:
   means to receive the signals;
   adjustable local oscillator signal means;
   mixer, connected to the means to receive and to the local oscillator means, in order to down-convert the carriers and provide a down-converted signal output;
   means to sample the down-converted signal;
   means to digitize the down-converted sampled signal output;
   means to resolve the sampled signal to thereby provide a modulation component of the digitized signal;
   means to prepare an output corresponding to the modulation;
   control means, the control means connected to the means to sample and to the means to resolve, the control means providing a signal for causing the means to sample to provide a sample of the digitized signal and for causing the means to resolve to provide the modulation component of the sample;
   means to filter the sampled signal in order to provide a band limited sampled signal;
   the means to resolve the sampled signal including means to extract peak value of the sampled signal; and
   means to interpolate the extracted peak value in order to provide a waveform model representative of the modulating signal.

2. Demodulator as described in claim 1, further characterized by:
   the control means being connected to the local oscillator for changing the down-converted output frequency.

3. Demodulator as described in claim 1, further characterized by:
   an anti-aliasing low pass filter providing the sampled signal in a form which reduces noise and aliasing effects of signal processing.

4. Demodulator as described in claim, 1 further characterized by:
   the means to resolve including a differentiator and a square law operator in order to differentiate and square the signal;
   a square root operator;
   means to filter the squared signal in order to provide the square root operator with a signal which, when passed through the square root operator, represents a frequency modulating signal.

5. Demodulator as described in claim 4, further characterized by:
   means to integrate the resolved signal, thereby providing a representation of a phase modulating signal.

6. Demodulator for signals which may have different forms of modulation of carriers, in which the carriers are subjected to frequency hopping, and in which the modulation is converted to a digital form, characterized by:
   means to receive the signals;
   means to anticipate a sequence of frequency changes of the carriers;
   local oscillator signal means which is frequency shifted in response to frequency changes indicated by the means to anticipate;
   mixer, connected to the means to receive and to the local oscillator means, in order to down-convert the carriers and provide a down-converted signal output;
   means to sample the down-converted signal;
   means to digitize the down-converted sampled signal output;
   means to filter the sampled signal in order to provide a band limited sampled signal;
   the means to resolve the sampled signal including means to extract peak value of the sampled signal; and
   means to interpolate the extracted peak value in order to provide a waveform model representative of the modulating signal.

7. Demodulator as described in claim 6, further characterized by:
   the control means being connected to the local oscillator for changing the down-converted output frequency.

8. Demodulator as described in claim 6, further characterized by;

the means to reduce including a differentiator and a square law operator in order to differentiate and square the signal;

a square root operator; and means to filter the squared signal in order to provide the square root operator with a signal which, when passed through the square root operator, represents a frequency modulating.

9. Demodulator as described in claim 8, further characterized by:

means to integrate the resolved signal, thereby providing a representation of a phase modulating signal.

* * * * *